(12) United States Patent
McCall et al.

(10) Patent No.: US 10,766,320 B2
(45) Date of Patent: Sep. 8, 2020

(54) SAFETY CHAIN TIE-DOWN INSERTS

(71) Applicant: B & W Custom Truck Beds, Inc., Humboldt, KS (US)

(72) Inventors: Travis M. McCall, Humboldt, KS (US); Tyler Jelinek, Manhattan, KS (US)

(73) Assignee: B & W Custom Truck Beds, Inc., Humboldt, KS (US)

( * ) Notice: Subject to any disclaimer, the term of this patent is extended or adjusted under 35 U.S.C. 154(b) by 128 days.

(21) Appl. No.: 15/695,704

(22) Filed: Sep. 5, 2017

(65) Prior Publication Data

US 2018/0065430 A1 Mar. 8, 2018

Related U.S. Application Data

(60) Provisional application No. 62/385,066, filed on Sep. 8, 2016.

(51) Int. Cl.
*B60D 1/28* (2006.01)
*B60D 1/01* (2006.01)
*B60D 1/48* (2006.01)
*B60D 1/52* (2006.01)
*B60D 1/58* (2006.01)

(52) U.S. Cl.
CPC .............. *B60D 1/28* (2013.01); *B60D 1/01* (2013.01); *B60D 1/485* (2013.01); *B60D 1/52* (2013.01); *B60D 1/583* (2013.01)

(58) Field of Classification Search
CPC .......... B60P 3/064; B60P 7/083; F16G 11/12; B60D 1/01; B60D 1/28; B60D 1/52; B60D 1/485; B60D 1/583

USPC ........................................................ 280/457
See application file for complete search history.

(56) References Cited

U.S. PATENT DOCUMENTS

| | | | |
|---|---|---|---|
| 6,585,465 B1 * | 7/2003 | Hammond | B60P 7/0815 410/104 |
| 7,281,889 B2 * | 10/2007 | Anderson | B60P 7/0815 410/102 |
| 8,215,658 B2 | 7/2012 | Stanifer et al. | |
| 8,360,458 B2 | 1/2013 | Stanifer et al. | |
| 8,414,009 B2 | 4/2013 | Stanifer et al. | |
| 9,067,468 B2 | 6/2015 | Stanifer et al. | |
| 9,150,067 B2 | 10/2015 | Hartleip et al. | |

(Continued)

*Primary Examiner* — Kevin Hurley
*Assistant Examiner* — Felicia L. Brittman
(74) *Attorney, Agent, or Firm* — Erickson Kernell IP, LLC; Kent R. Erickson

(57) ABSTRACT

A tie-down apparatus securable within a slot of a slotted receiver includes a pedestal, a safety chain connector and a locking member pivotally connected to the safety chain connector. A vertical bore extends through the pedestal and two legs depend from the pedestal body on opposite sides of the bore. Each leg is narrower in width than a width of the slot so that the legs may be inserted widthwise into the slot to prevent the pedestal from rotating in the slot. The safety chain connector includes a bail and a downwardly extending latching member extending through the bore in the pedestal and is rotatable relative to the base to rotate the latching member into engagement with the slotted receiver whereupon the locking member pivots into engagement with the pedestal preventing rotation of the safety chain connector out of latching engagement with the slotted receiver.

19 Claims, 12 Drawing Sheets

(56) References Cited

U.S. PATENT DOCUMENTS

| | | |
|---|---|---|
| 9,248,713 B2 | 2/2016 | Mida et al. |
| 9,522,583 B2 * | 12/2016 | McCoy .................... B60D 1/28 |
| 2015/0028565 A1 | 1/2015 | Bowe |
| 2015/0090847 A1 | 4/2015 | McCoy |
| 2015/0224836 A1 | 8/2015 | Stanifer et al. |
| 2015/0273962 A1 | 10/2015 | Stanifer et al. |
| 2018/0215218 A1 * | 8/2018 | McCoy .................... B60D 1/28 |

* cited by examiner

SAFETY CHAIN TIE-DOWN INSERTS

CROSS-REFERENCE TO RELATED APPLICATIONS

This application claims the benefit of U.S. Provisional Patent Application No. 62/385,066 filed Sep. 8, 2016 the disclosure of which is hereby incorporated herein in its entirety by reference.

BACKGROUND

Hitch mounting systems are connected to the frames of pick-up trucks to allow the user to removably mount a hitch in the pick-up truck bed including fifth wheel type hitches and gooseneck hitches. Such mounting systems typically incorporate sockets or receivers which extend through openings cut in the bed with the top of the socket or receiver extending flush with the bed so as not to interfere with use of the bed when the hitch is removed.

U.S. Pat. No. 7,828,317 to Withers et al. discloses an integrated hitch mounting system for fifth wheel or gooseneck trailer hitches of a type which is an option for purchasers to include as part of the original equipment of a Ford® pick-up truck. Other pick-up truck manufacturers offer similar hitch mounting systems and such systems may also be available to install as after-market accessories. FIG. 1 herein is representative of existing hitch mounting systems or hitch mounts 1 of the type offered with Ford® pick-up trucks. The hitch mount 1 includes a body 2 with a centrally located gooseneck ball receiver 3 and four peripherally located slotted receivers 4 which are commonly referred to as pucks. As discussed in the Whithers et al. patent, the slotted receivers 4 may be used to receive quarter turn locking pins projecting downward from the four corners of a fifth wheel hitch pedestal or base for securing the fifth wheel hitch to the hitch mount 1.

U.S. Pat. No. 8,215,658 to Stanifer et al. and Patent Application Publication No. U.S. 2015/0028565 to Bowe disclose safety chain tie-downs adapted to be removably secured in the slotted receivers 4 of a hitch mounting system such as hitch mount 1 of FIG. 1. The tie-downs are particularly well adapted for use in association with a gooseneck hitch ball secured in the gooseneck ball receiver 3 of the hitch mount 1. Safety chain tie-downs are inserted in two of the slotted receivers 4, preferably the two rearmost receivers 4 so that safety chains from a trailer connected to the gooseneck hitch ball by a gooseneck coupler are removably securable to the safety chain tie-downs. The safety chains connected to the safety chain tie-downs prevent the trailer from completely separating from the truck if the gooseneck coupler on the trailer separates from the gooseneck hitch ball.

As seen in FIGS. 2, 4 and 9, each of the slotted receivers 4 includes a sidewall 6 surrounding a receiver pocket 7. A cover plate 8 extends across an upper end of the sidewall 6 over the pocket 7. A generally rectangular shaped slot 10 is formed through the center and across a diameter of the cover plate 8 so that the portions of the cover plate extending from the sidewall 6 to the slot 10 form inwardly projecting lips or shoulders 12 running along the length of the slot 10 on opposite sides thereof. The slot 10 opens to the pocket 7. The length L of slot 10 is greater than its width W. The slotted receivers or pucks 4 are preferably mounted in a truck bed so that the upper surface of the cover plate preferably extends flush with bed of the truck.

Known safety chain tie-downs generally include a body with a bail or loop formed on and projecting upward therefrom to which a hook of a safety chain can be connected and a t-shaped bolt or latching member projecting downward from the body. The t-bolt has a shaft having a diameter which is slightly smaller than the width of the slot 10 and a head which is longer than the width of the slot 10. The head is spaced from the body of the tie-down a distance which is slightly greater than the thickness of the inwardly projecting shoulders 12 of the slotted receivers 4. The t-bolt may be inserted in slot 10 with the head oriented lengthwise in alignment with the length of the slot 10 and then the tie-down 4 is rotated ninety degrees so that the portions of the t-bolt head projecting outward from the shaft extend under the inwardly projecting shoulders 12 preventing the tie-down from being pulled out of the slotted receiver 4 without rotating the t-bolt head back ninety degrees to align it lengthwise with the slot 10.

To prevent the tie-down body from rotating from an alignment in which portions of the t-bolt head project under the shoulders 12 to a position in which they are aligned with the slot 10 allowing separation of the tie-down from the receiver 4, Stanifer et al. disclose a two legged locking member in which the legs extend through apertures formed in the tie-down body on opposite sides of the t-bolt shaft. The legs are spaced wider than the slot 10 and are generally positioned to the sides of the t-bolt head such that they engage the upper surface of the cover plate 8 and are pushed upward when the t-bolt is inserted lengthwise relative to slot 10. When the tie-down is rotated ninety degrees the legs extend over the slot 10 and drop down into the slot 10 preventing rotation of the tie-down relative to the receiver 4. The operator then must lift the locking member and its legs upward to allow rotation of the tie-down body ninety degrees to permit its removal from the receiver 4.

U.S. Patent Application Publication No. 2015/0028565 to Bowe discloses use of a locking pin extending through an aperture in the tie-down body which drops in the slot 10 when the tie-down is rotated to a secured position to prevent the tie-down from rotating back to an unsecured alignment. A lynch pin is also provided for further securing the locking pin to the body when it has dropped into the locking position to ensure the locking pin does not become dislodged when the truck travels over bumpy terrain or roads.

There remains a need for other options for tie-downs that are easy to install and which automatically lock in place when inserted and which are relatively easy to manufacture.

SUMMARY

Exemplary embodiments are defined by the claims below, not this summary. A high-level overview of various aspects thereof is provided here to introduce a selection of concepts that are further described in the Detailed-Description section below. This summary is not intended to identify key features or essential features of the claimed subject matter, nor is it intended to be used in isolation to determine the scope of the claimed subject matter. In brief, this disclosure describes a tie-down apparatus removably securable to a slotted receiver of a hitch mount for a truck bed.

A slot is formed through a top of the slotted receiver which includes first and second inwardly projecting shoulders extending over a receiver pocket on opposite sides of the slot. The tie-down apparatus includes a pedestal having a body with a bore extending therethrough along a vertical axis and first and second legs depending from the pedestal body on opposite sides of the bore. The first and second legs each have a width that is narrower than a width of the slot of the slotted receiver so that the legs may be inserted widthwise into the slot. The tie-down apparatus also includes a safety chain connector pivotally connected to the pedestal. The safety chain connector includes a base, a bail extending upward from the base and a latching member extending downward from the base. The latching member includes a neck and a head comprising first and second flanges projecting radially outward from the neck in opposite directions. The head is narrower than the width of the slot of the slotted receiver and longer than the width of the slot.

The safety chain connector is rotatably mounted to the pedestal with the latching member extending through the bore therein and rotatable between an unlatched orientation and a latched orientation. In the unlatched orientation, a longitudinal axis of the head extends in alignment with a longitudinal axis through the first and second legs such that the first and second flanges extend below the first and second legs and such that the first and second legs and the head of the latching member are insertable widthwise into the slot of the slotted receiver. In the latched orientation at least a portion of each of the first and second flanges extends under the first and second inwardly projecting shoulders respectively of the slotted receiver.

The tie-down further includes a locking member pivotally connected to the base of the safety chain connector and having first and second interference members or ears pivotal between raised and lowered positions. In the raised position, the first and second interference members do not extend below the base of the connector and do not prevent rotation of the safety chain connector relative to the pedestal. In the lowered or locking position the first and second interference members extend below the base of the safety chain connector and in closely spaced relation to opposite sides of the pedestal preventing rotation of the safety chain connector relative to the pedestal.

When the safety chain connector is rotated to the latched orientation relative to the pedestal, the locking member pivots by gravity into engagement with the pedestal to prevent further rotation of the safety chain connector relative to the pedestal. Because the pedestal does not rotate relative to the receiver and the safety chain connector is prevented from rotating relative to the pedestal by the locking member, the flanges of the latching member head cannot be pivoted out from under the overhanging shoulders of the receiver cover plate which thereby prevents removal of the safety chain tie-down from the receiver.

DESCRIPTION OF THE DRAWINGS

Illustrative embodiments are described in detail below with reference to the attached drawing figures, and wherein.

DETAILED DESCRIPTION

Figure 1:
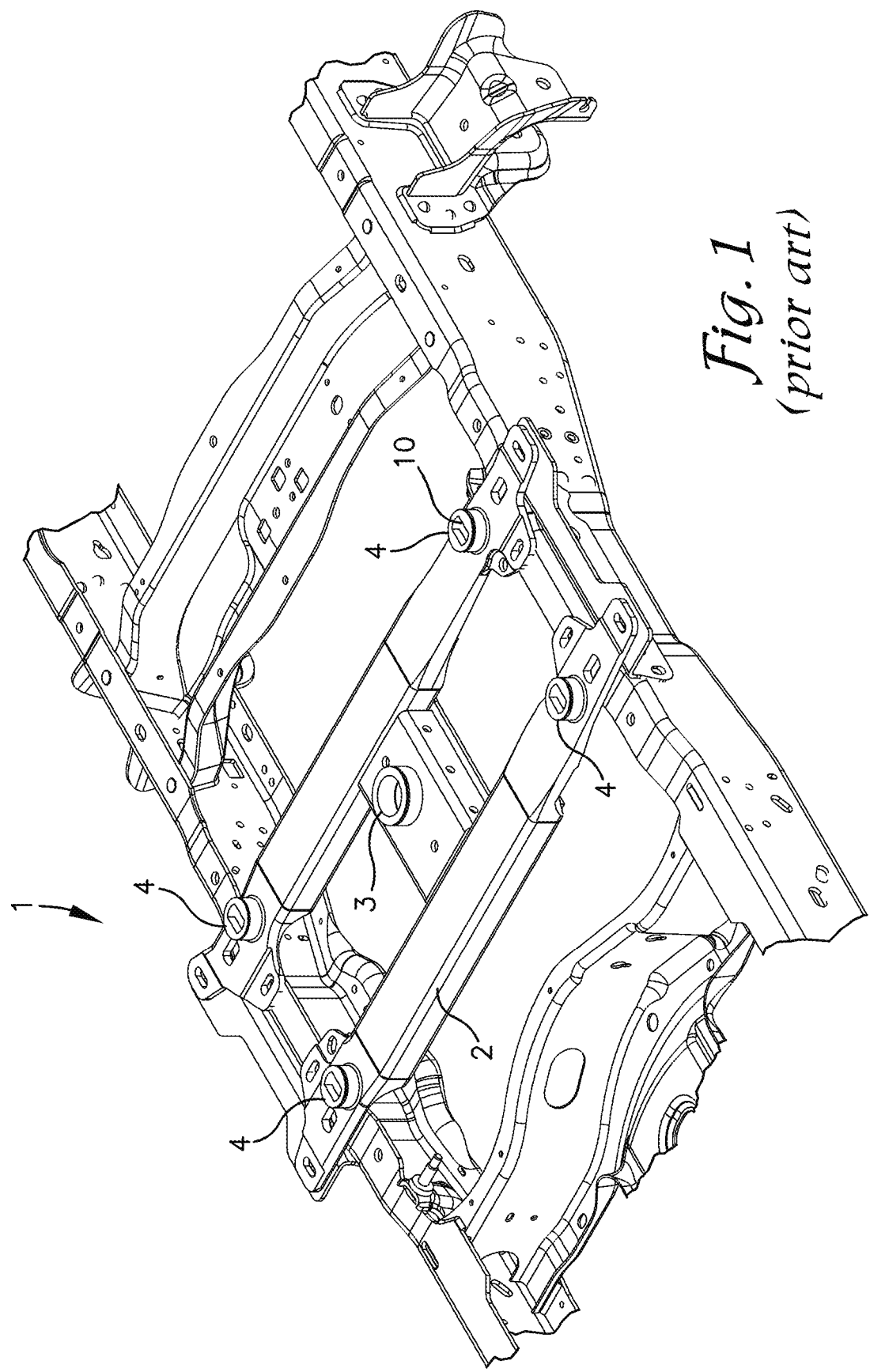
FIG. 1 is a perspective view of a known hitch mount.
Figure 2:
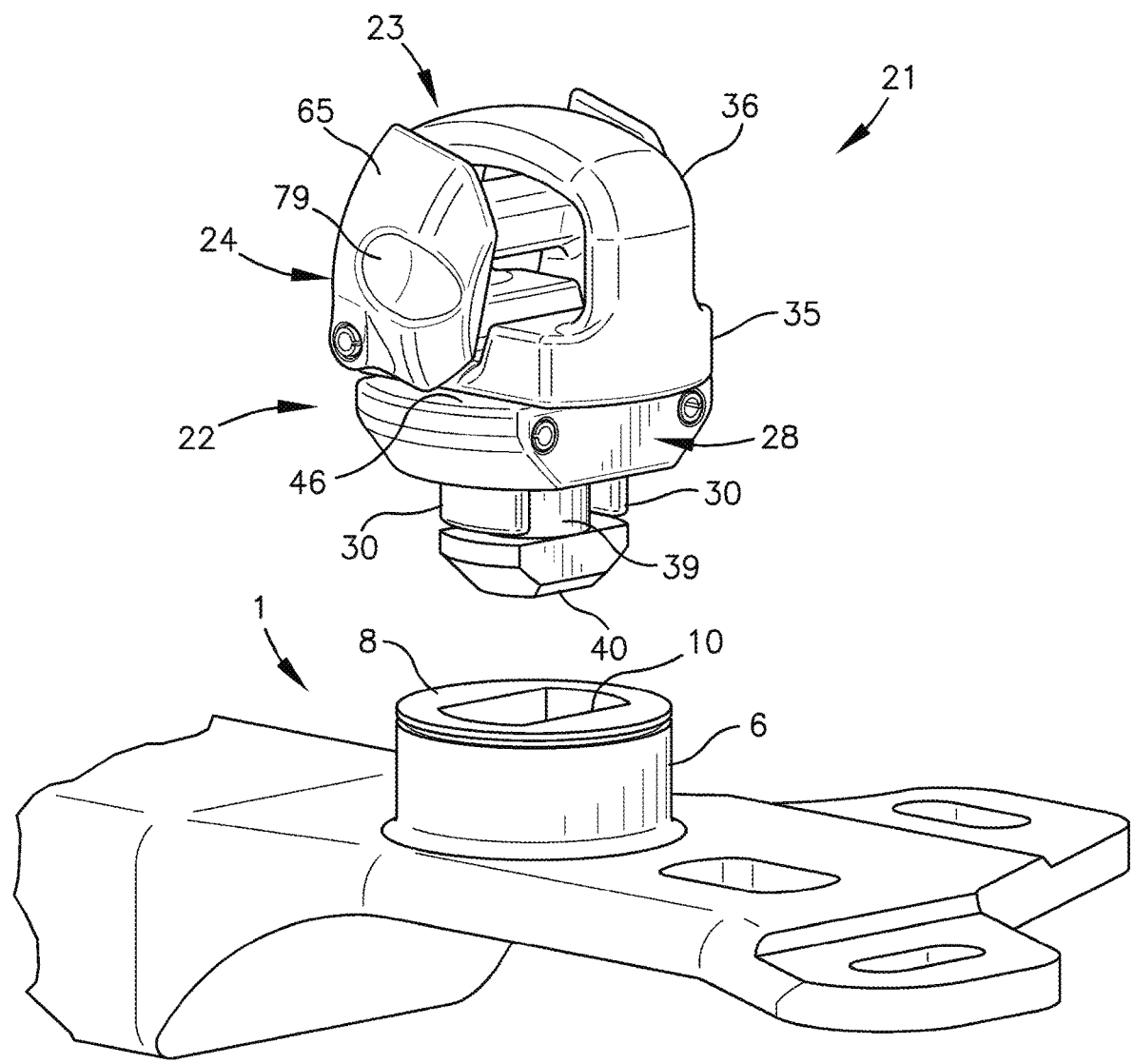
FIG. 2 is a perspective view of a safety chain tie-down in an unlatched and unlocked orientation and separated from a slotted receiver of the known hitch mount depicted in accordance with an exemplary embodiment.
Figure 3:
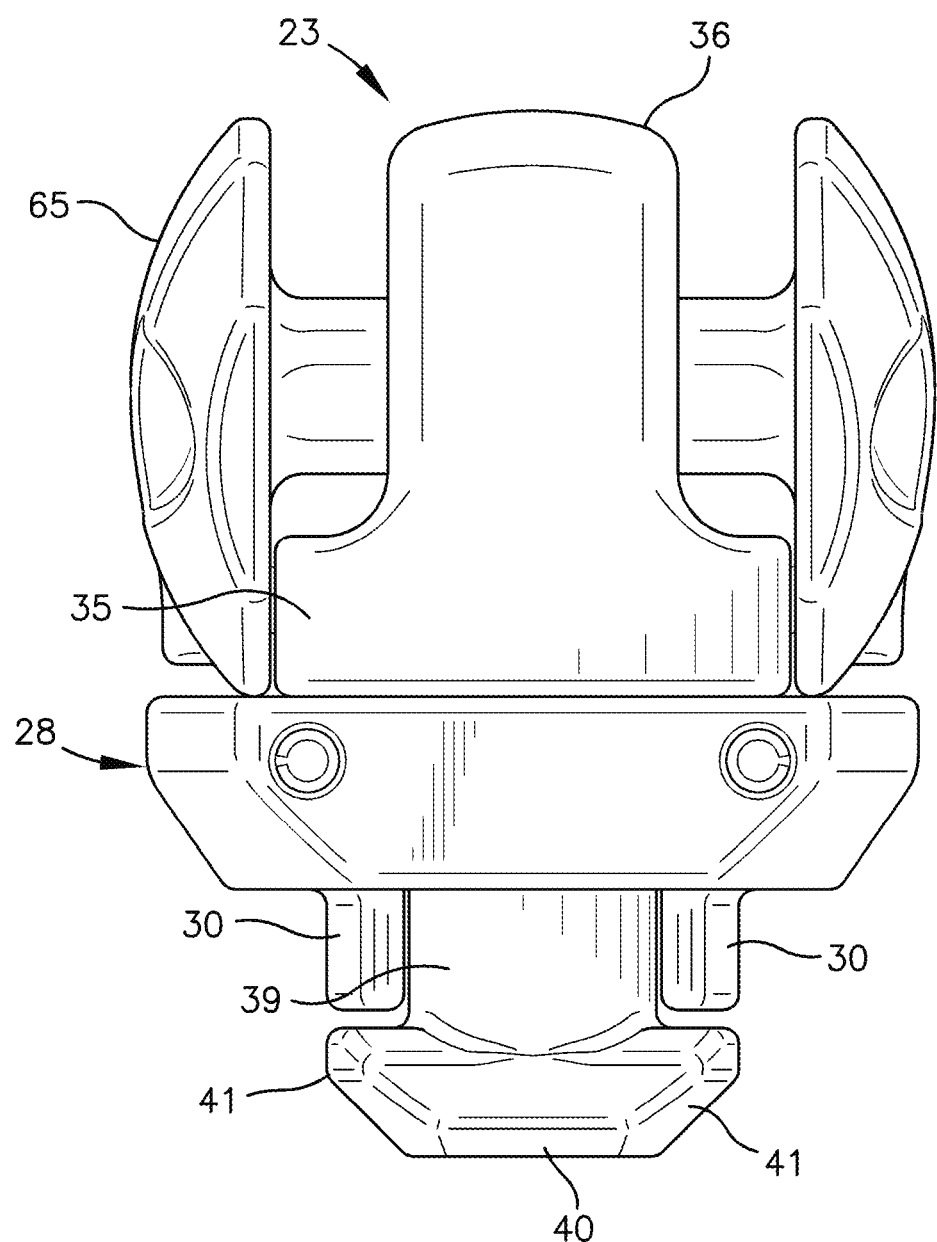
FIG. 3 is a front plan view of the safety chain tie-down in the unlatched and unlocked orientation as in FIG. 2.
Figure 4:
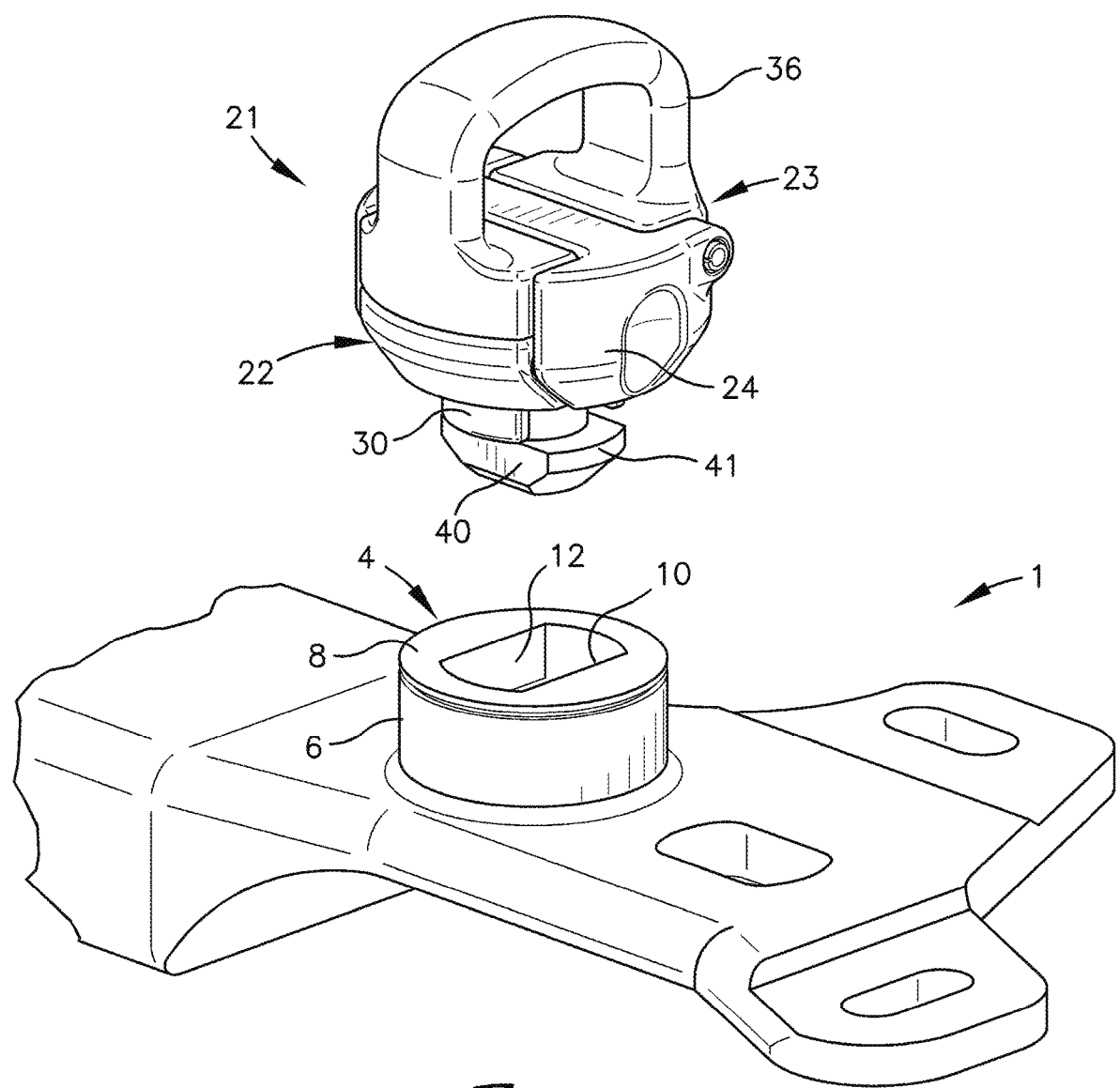
FIG. 4 is a perspective view of the safety chain tie-down in the latched and locked orientation and separated from the slotted receiver.
Figure 5:
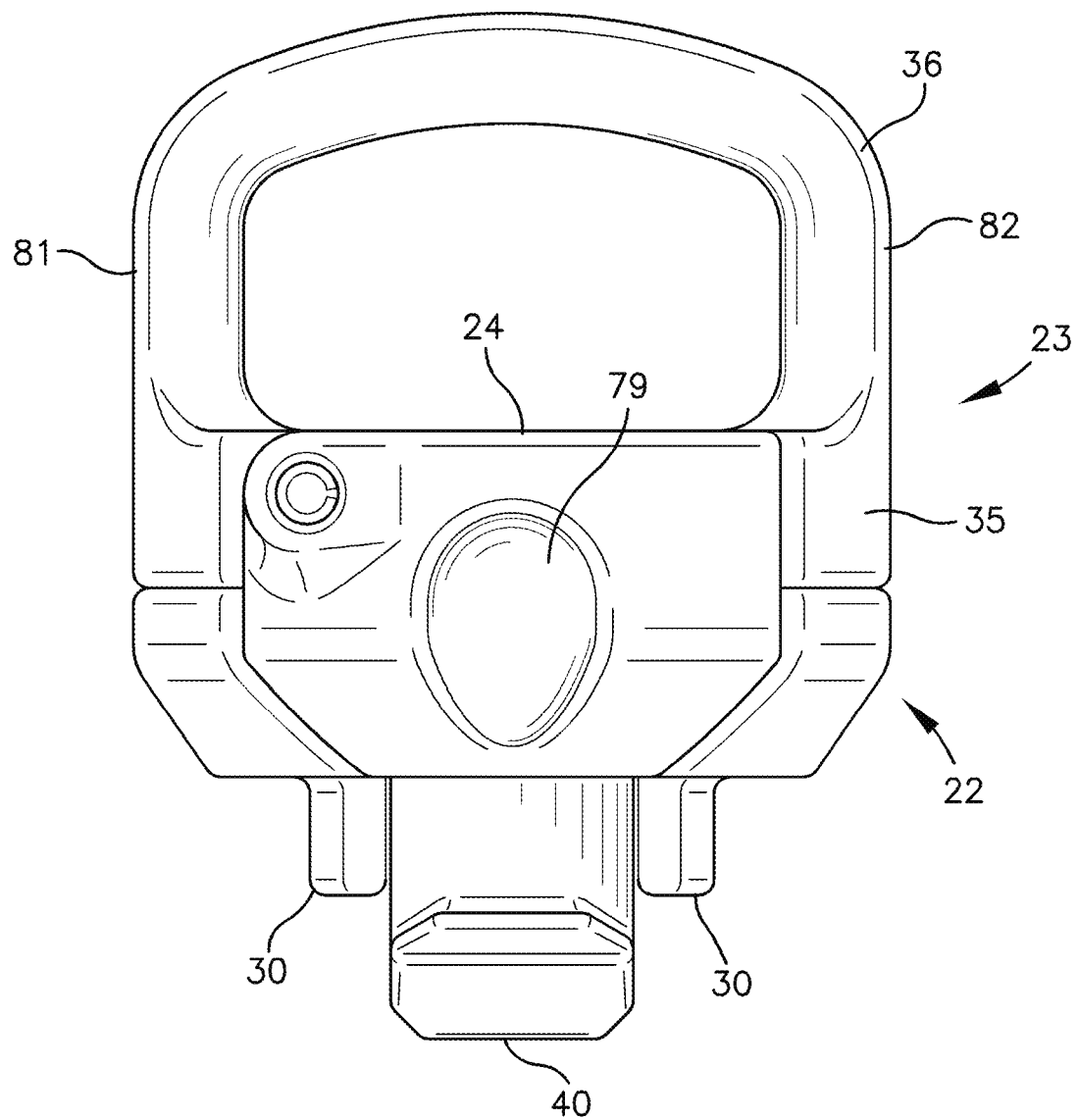
FIG. 5 is a side view of the safety chain tie-down in the latched and locked orientation.
Figure 6:
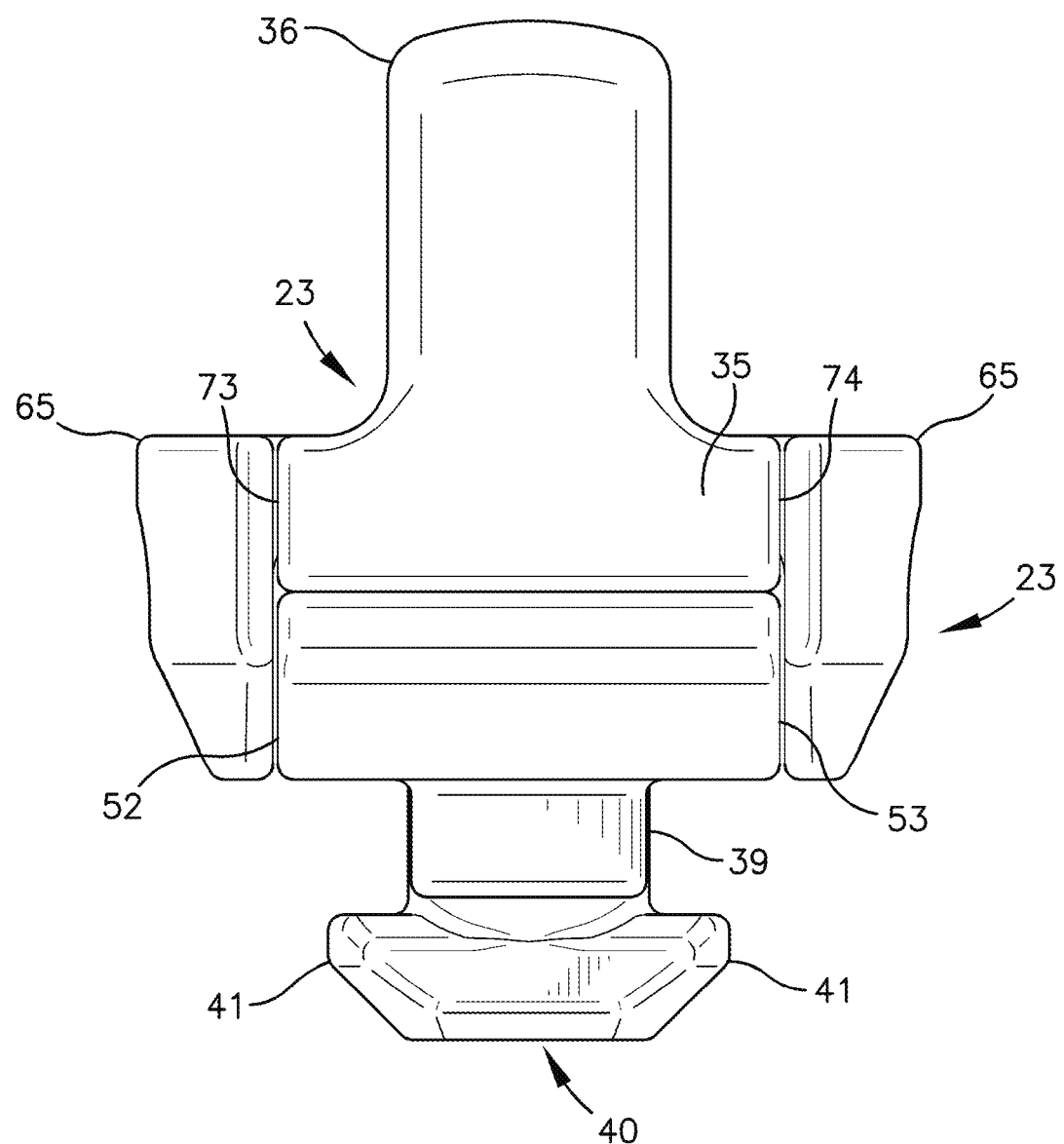
FIG. 6 is a front view of the safety chain tie-down as shown in FIG. 5 in the latched and locked orientation.
Figure 7:
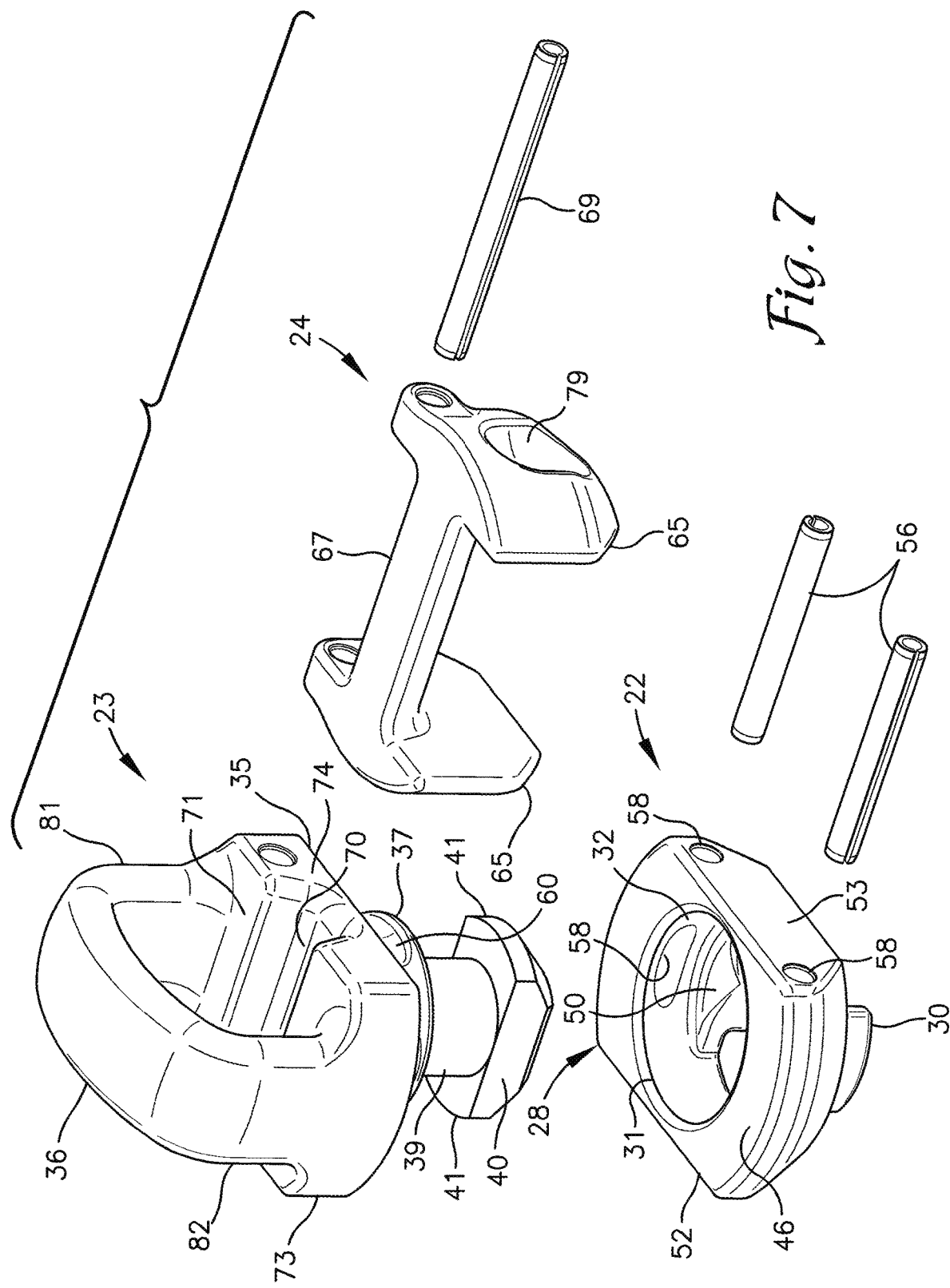
FIG. 7 is an exploded, perspective view of the safety chain tie-down.

The subject matter of select exemplary embodiments is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" as used herein denote deviations from the exact value by +/−10%, preferably by +/−5% and/or deviations in the form of changes that are insignificant to the function.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to FIGS. 2-12, a safety chain tie-down 21 for securing safety chains to a slotted receiver 4 in a truck bed is shown in accordance with an exemplary embodiment. In the drawings, the corrugated panel forming the floor of the truck bed is not shown. Tie-down 21 includes a seating member or pedestal 22, a safety chain connector 23 which rotates relative to the pedestal 22 and a locking member 24 pivotally connected to the safety chain connector 23. The pedestal 22 includes a body 28 and depending legs 30 which extend on opposite sides of a stepped bore 31 extending through the body 28. The legs 30 are insertable within the slot 10 of receiver 4 to prevent the pedestal from rotating, to an appreciable degree, relative to the receiver 4. The safety chain connector 23 includes a base 35 with a closed loop, bail or coupling member 36 extending upward from the base 35 for securing a safety chain thereto, a cylindrical hub 37 projecting below the base 35 and adapted for rotatably securing the safety chain connector 23 to the pedestal 22, and a latching member or t-bolt 38 extending downward from the hub 37. The hub 37 extends into and the t-bolt 38 extends through the stepped bore 32 in pedestal 28.

Figure 8:
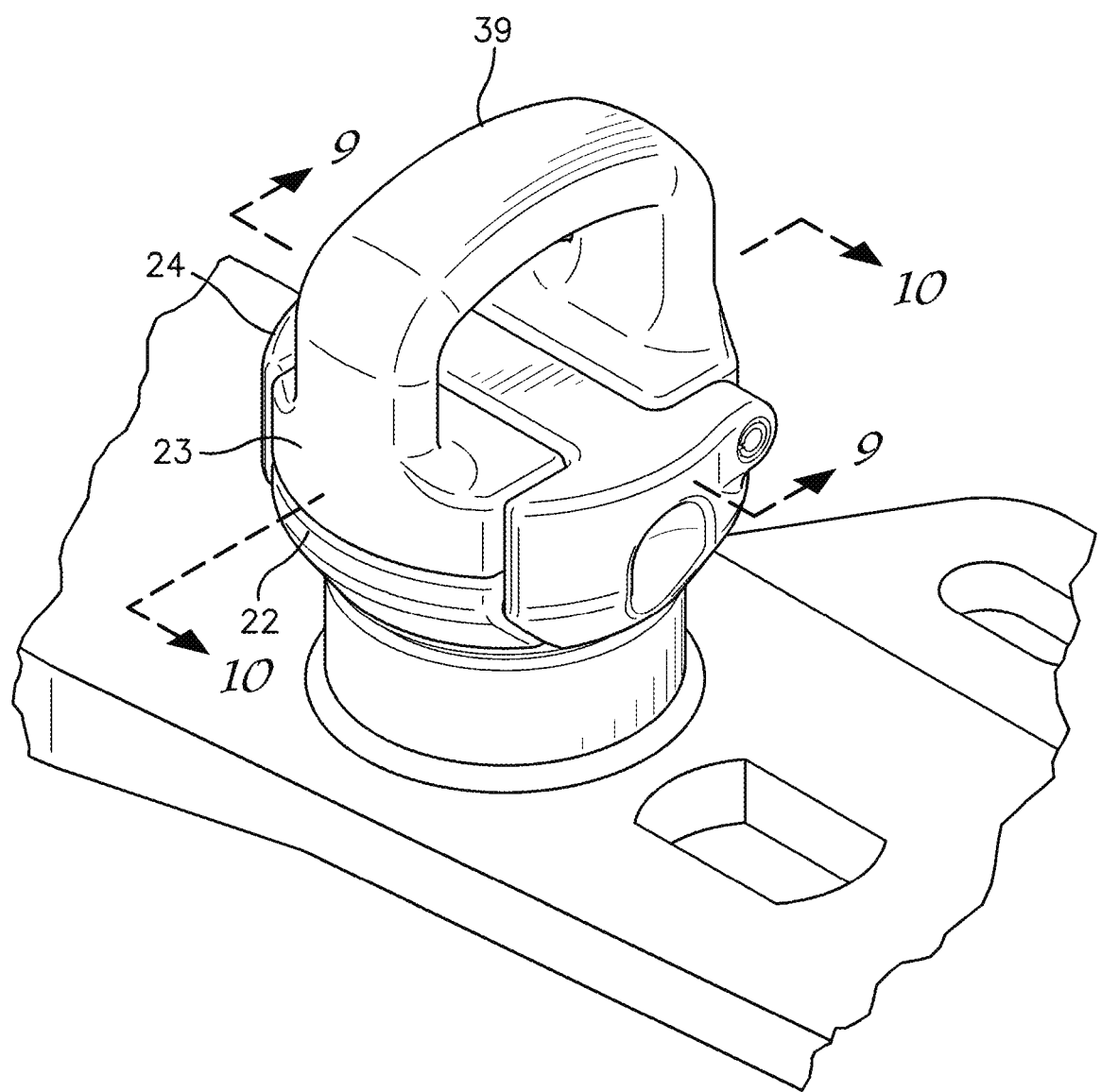
FIG. 8 is a perspective view of the safety chain tie-down in the latched and locked orientation in the slotted receiver.
Figure 9:
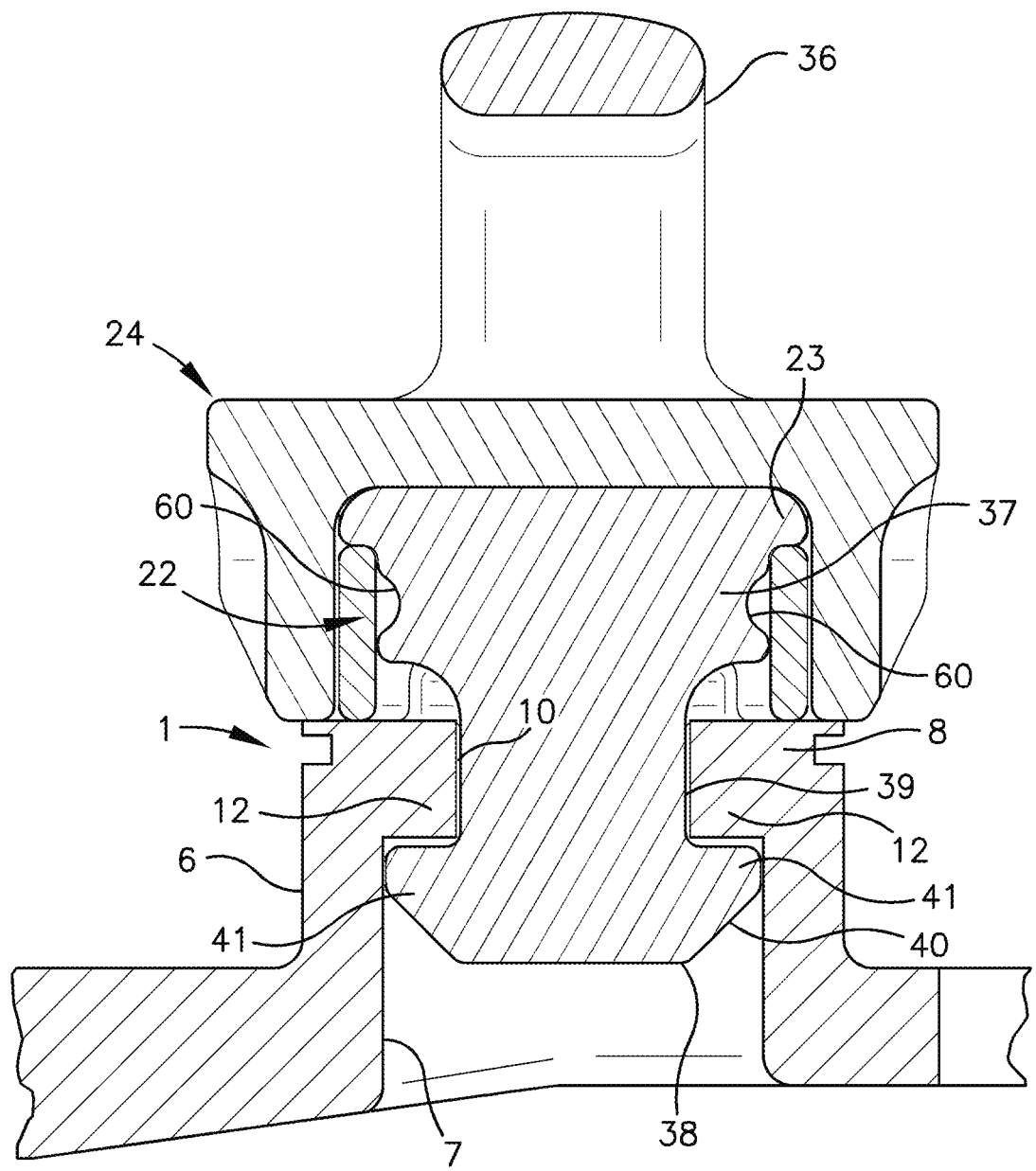
FIG. 9 is a cross-section al view taken along line 9-9 of FIG. 8 showing the safety chain tie-down in latched and locked in position in the slotted receiver of the hitch mount.
Figure 10:
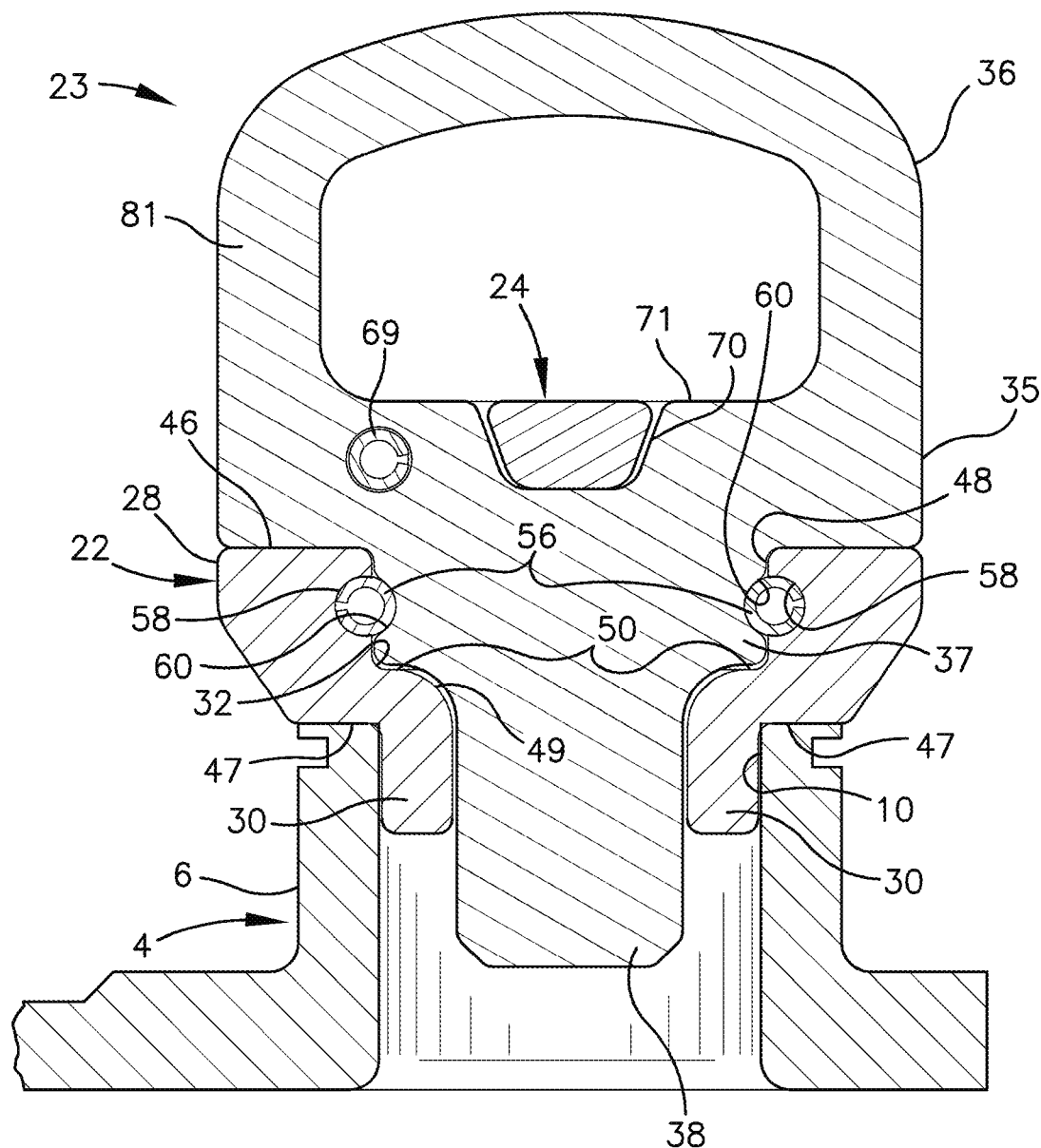
FIG. 10 is a cross-sectional view taken along line 10-10 of FIG. 8.
Figure 11:
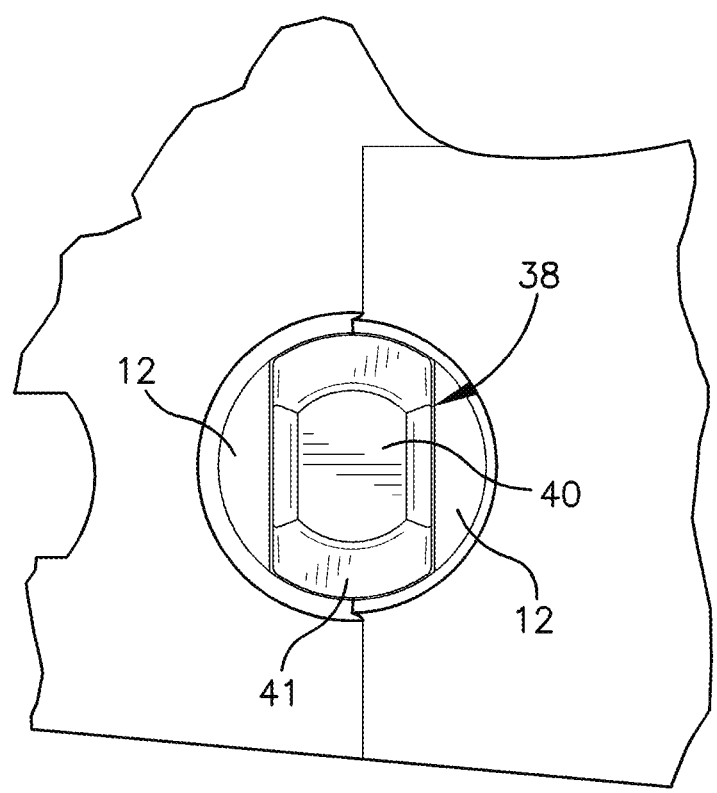
FIG. 11 is a bottom view of the safety chain tie-down inserted in a slot in the slotted receiver of the hitch mount and with the tie-down in the unlatched orientation.
Figure 12:
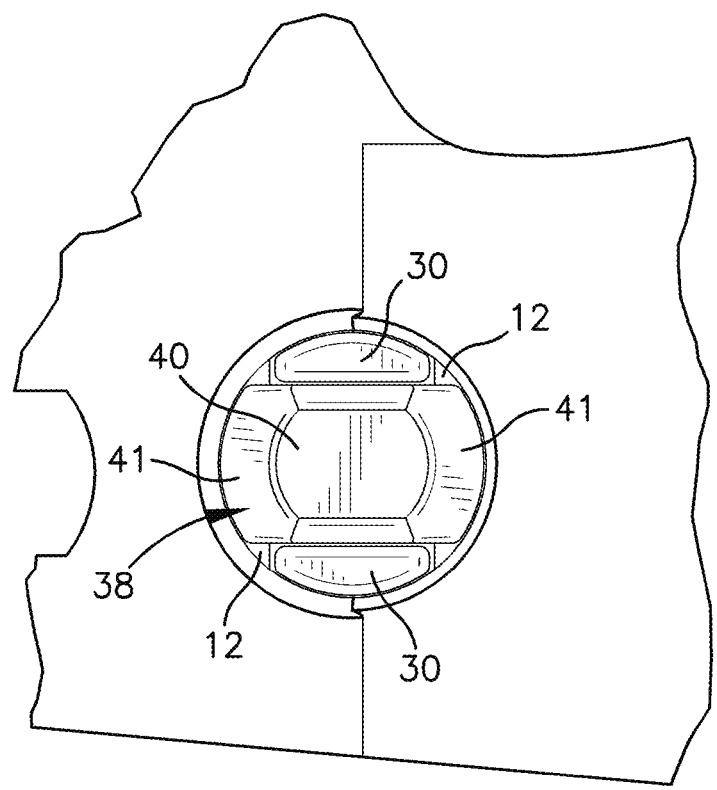
FIG. 12 is a bottom view of the safety chain tie-down inserted in the slot in the slotted receiver of the hitch mount and with the tie-down in the latched orientation.
Figure 13:
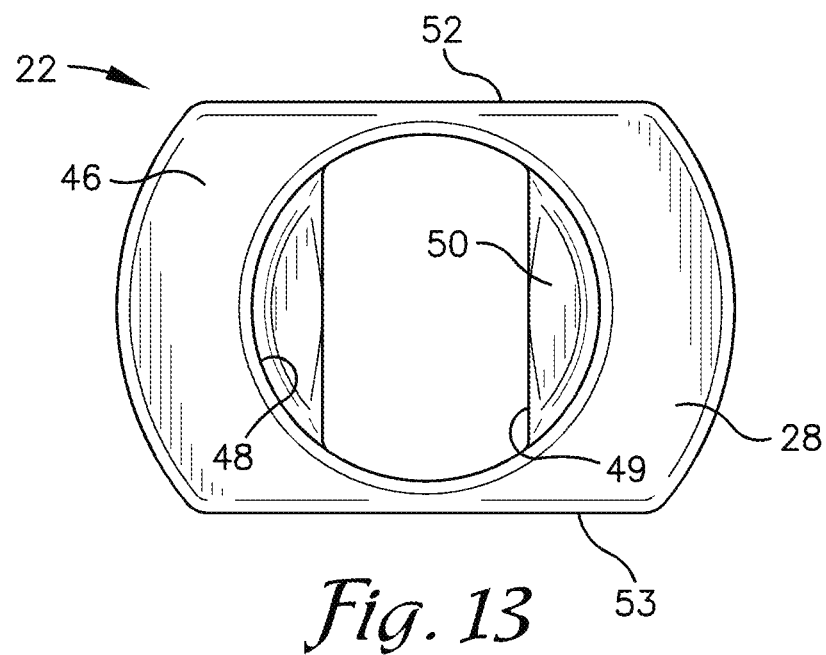
FIG. 13 is a top plan view of a pedestal of the safety chain tie-down.
Figure 14:
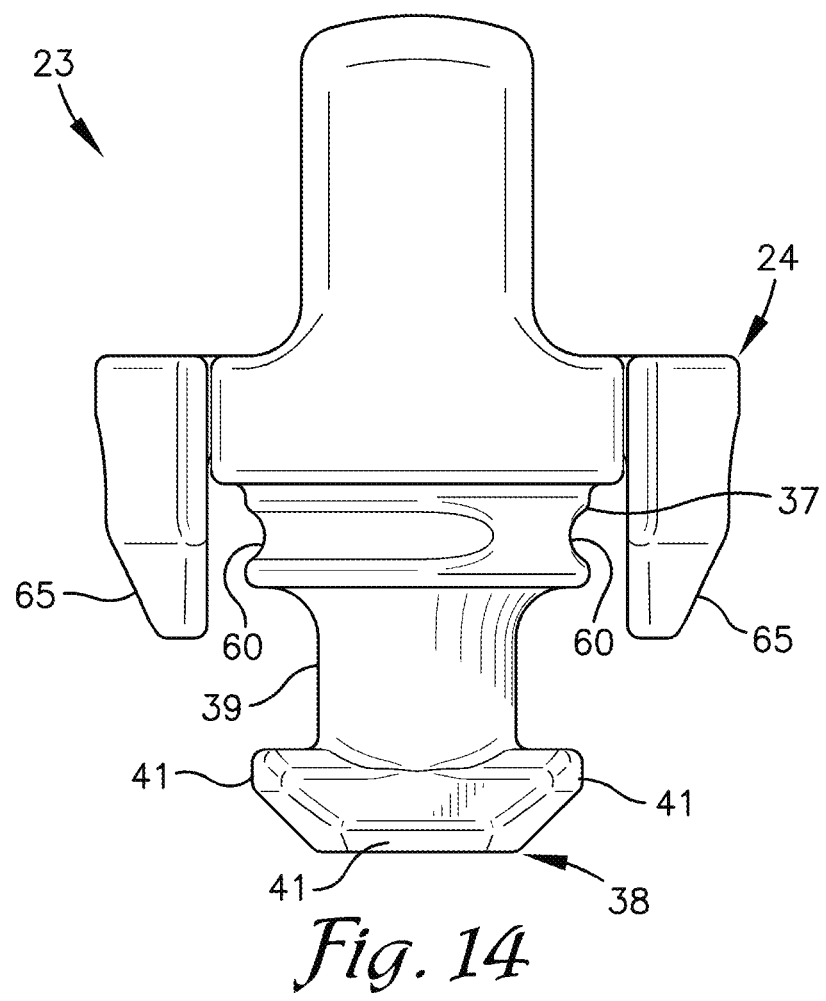
FIG. 14 is a front view of the safety chain tie-down similar to FIG. 6, but with the pedestal removed.

The t-bolt 38 includes a neck 39 and an enlarged head 40 formed from first and second, opposingly directed flanges 41 projecting radially outward from the neck 39 at a lower end thereof. In the embodiment shown, the flanges 41 are aligned along an axis extending perpendicular to a longitudinal axis of the safety chain connector 23 and the bail 36. T-bolt 38 is adapted to selectively secure the safety chain tie-down 21 to the slotted receiver 4 upon rotation of the safety chain connector 23, about a first or vertical axis, into a latched orientation relative to the pedestal 22 wherein the flanges 41 of the t-bolt head 40 extend under the inwardly projecting shoulders 12 of the receiver cover plate 8. When the safety chain connector 23 is rotated to the latched orientation relative to the pedestal 22 as shown in FIG. 8, the locking member 24 pivots by gravity into engagement with the pedestal 22 to prevent further rotation of the safety chain connector 23 relative to the pedestal 22. Because the pedestal 22 does not rotate relative to the receiver 6 and the safety chain connector 23 is prevented from rotating relative to the pedestal 23 by the locking member 24, the flanges 41 of t-bolt head 40 cannot be pivoted out from under the overhanging shoulders 12 of the receiver cover plate 8 which thereby prevents removal of the safety chain tie-down 21 from the receiver 6.

A stepped bore or opening 32 is formed through the pedestal body 28 along a vertical or first axis extending from an upper surface 46 to a lower surface 47. First and second legs 30 depend from the lower surface 47 of the body 28 on opposite sides of bore 32. An upper portion 48 of the bore 32 is circular in cross-section. In the embodiment shown, a lower portion 49 of bore 42 is formed as a slot with a longitudinal axis extending perpendicular to a longitudinal axis of the pedestal body 28. The lower portion 49 of bore 32 is narrower than the upper portion 48, such that two inwardly projecting shoulders 50 are formed on either side of slot 49. Shoulders 50 may form a seat for supporting the hub 37 of the safety chain connector 23.

Each leg 30 depends from a respective shoulder 50 of pedestal body 28 adjacent slot 49 and generally centered relative to the respective shoulder 50. The width of each leg 30, generally taken along the sides of slot 49, is slightly narrower than the width of the slot 10 in slotted receiver 4 such that when the pedestal 22 is positioned with the legs 30 extending into slot 10, generally perpendicular to the length or parallel to the width of slot 10, the pedestal 22 cannot be rotated more than a limited number of degrees relative to the slotted receiver 4 and preferably less than approximately fifteen degrees and in a preferred embodiment less than five degrees. The width of the slot 49 in the pedestal 22 and the spacing between legs 30 is sufficiently wide that the legs 30 can only be inserted in slot 10 when oriented generally perpendicular to the length or parallel to the width of the slot 10.

Opposite, vertical sides 52 and 53 of pedestal body 28 are preferably planar and extend in parallel relation to one another and in parallel relation to a longitudinal axis of the pedestal body 28. The diameter of the upper portion 48 of bore 32 is slightly narrower than the spacing between vertical sides 52 and 53 of the pedestal body 28. Upper and lower surfaces 46 and 47 of the pedestal body 28 are preferably planar and extend in parallel spaced relation. The lower surface 47 of pedestal body 28 is adapted to be supported on an upper surface of the cover plate 8 of a slotted receiver 4 and the upper surface 46 of the pedestal body 28 provides a bearing surface for the base 35 of the safety chain connector 23.

In the embodiment shown, the safety chain connector 23 is secured to the pedestal body 28 by two roll pins or compression pins 56 inserted in respective pin receiving bores 58 extending through the pedestal body 22. The pin receiving bores 58 extend approximately tangentially to and in overlapping relationship with the upper portion 48 of the stepped bore 32 so that the pin receiving bores 58 open into the upper portion 48 of stepped bore 32. Two pin receiving grooves 60 are formed in the hub 37 around an outer periphery thereof. Pins 56 are inserted in aligned pairs of pin receiving grooves 60 in hub 37 of safety chain connector 23 and pin receiving bores 58 in the pedestal body 28 to secure the safety chain connector 23 to pedestal 23. The arc length of each pin receiving groove 60 is selected to permit the safety chain connector 22 to rotate approximately ninety degrees relative to the pedestal 22.

The legs 30 of pedestal 22 are sized to be slightly shorter than the thickness of the inwardly projecting shoulders 12 of the receiver cover plate 8. The neck 39 of t-bolt 38 is longer than the distance the legs 30 depend from the pedestal 22, and the length of the head 40, through flanges 41, is greater than the spacing between legs 30 and preferably approximately equal to the distance between the outer surfaces of the legs 30. The diameter of the neck 39 and the width of the head 40 of the t-bolt 38 are narrower than the width of the slot shaped lower portion 49 of bore 32 and narrower than the spacing between legs 30, and the length of the head 40 of t-bolt 38 is shorter than length of the slot 49, so that during assembly, with the head 40 oriented in lengthwise alignment with the slot 49, the t-bolt head 40 may be inserted through the slot 49 and between the legs 30 until head 40 including flanges 41 are spaced below the lower ends of legs 30. With safety chain connector 23 seated against pedestal 22, rotation of the connector 23 ninety degrees relative to the pedestal 22 rotates the flanges 41 of t-bolt head 40 directly under legs 30 which may be referred to as an unlatched orientation. The width of legs 30 and head 40 are approximately the same and narrower than the slot 10 in receiver 4 so that when the safety chain connector 23 is rotated to the unlatched orientation relative to the pedestal 22, the aligned head 40 and legs 30 may be inserted into slot 10. With the t-bolt head 40 and legs 30 inserted in slot 10, subsequent rotation of the safety chain connector 23 ninety degrees relative to the pedestal 22 to a latched orientation, rotates the flanges 41 of the head 40 under the inwardly projecting shoulders 12 of the cover plate 8 of receiver 4 preventing withdrawal of the safety chain connector 23 and the tie-down 21 from the receiver 4 until the head 40 is rotated back into lengthwise alignment with the slot 10.

When the safety chain connector 23 is rotated to the latched orientation with the flanges 41 of head 40 extending under shoulders 12, the locking member 24 pivots by gravity into engagement with the pedestal 22 to prevent rotation of the safety chain connector 23 relative to the pedestal 22. Because the legs 30 of the pedestal 23, extending in slot 10, prevent the pedestal 23 from rotating any appreciable degree relative to receiver 4, and because the safety chain connector 23, with the flanges 41 of its head 40 extending directly under the shoulders 12 of receiver cover plate 8 is prevented from rotating relative to the pedestal 23 by locking member 24, the safety chain tie-down 21 is prevented from being removed from the receiver 4 until the locking member 24 is pivoted out of engagement with the pedestal 23.

In the embodiment shown, the locking member 24 includes a pair of interference members, legs or ears 65 connected to or formed on opposite ends of a crossbar 67. The locking member 24 is pivotally connected to the base 35 of the safety chain connector 35 by a pivot pin 69 extending through the base 35 and aligned upper corners of the ears 65. The crossbar 67 extends between the base 35 and bail 36 of the safety chain connector 23. A crossbar receiving groove 70 is formed in an upper surface 71 of the base 35 and extends laterally across the base 35 between lateral sidewalls 71 and 72 thereof. Lateral sidewalls 73 and 74 of base 35 are planar and extend vertically and parallel to a longitudinal axis of the base 35 and bail 36. The width of the safety chain connector base 35 between sides 73 and 74 matches the width of the pedestal 22 between lateral sidewalls 52 and 53 of the pedestal body 28. Lateral sidewalls 52 and 53 are also planar and extend vertically in parallel relation to a longitudinal axis of the pedestal 22.

The interference members 65 of locking member 24 are spaced apart slightly wider than the lateral sidewalls 73 and 74 of the base 35 and sidewalls 52 and 53 of pedestal 23. When the safety chain connector 23 is rotated to the latched orientation relative to the pedestal 22, the lateral sidewalls 73 and 74 of base 35 extend in planar alignment with the lateral sidewalls 52 and 53 respectively of pedestal 22. The locking member 24 pivots by gravity downward until the cross bar 67 is received in groove 70 at which point upper portions of each interference member 65 extend adjacent the lateral sidewalls 73 and 74 of base 35 and lower portions of each interference member 65 extend adjacent the lateral sidewalls 52 and 53 of the pedestal 23 which prevents rotation of the safety chain connector 23 relative to the pedestal 22.

To permit rotation of the safety chain connector 23 relative to pedestal 22, the locking member 24 is manually pivoted upward and away from the pedestal 22 generally along a longitudinal axis thereof until the crossbar 67 abuts against a first leg 81 of bail which may be described as the unlocked position. In the unlocked position, no portion of the ears 65 extends below the safety chain connector base 35 and therefore, the safety chain connector 23 can be rotated relative to the pedestal 22 and to the unlatched position. Gripping features such as finger grooves 79 may be formed in outer surfaces of the locking member ears 65 to facilitate grasping and pivoting of the locking member 24 to the unlocked position.

When the locking member 24 is in the unlocked position and pivoted toward the first leg 81 of bail 36, its center of gravity extends to one side of a vertical axis or plane through the pivot pin 69 and toward the opposite leg 82 of the bail 36. With the locking member manually pivoted to and held in the unlocked position, and the safety chain connector 23 rotated to the unlatched position relative to pedestal 22, the locking member 24 can be released and it will pivot downward slightly until a lower or rear edge of each ear 65 abuts and rests against a respective portion of the upper surface 46 of pedestal body 28 and the tie-down 21 can then be inserted in or removed from the receiver 4 of the hitch mount 1. After insertion of a tie-down 21 in a receiver 4, upon rotation of the connector 23 to the latched orientation, once the sidewalls 73 and 74 of the connector base 35 are rotated back into alignment with the respective sidewalls 52 and 53 of pedestal 22, the locking member 24 pivots downward until the ears 65 extend in overlapping relationship with both sets of sidewalls, 73 and 52, and 74 and 53.

With the safety chain connector 23 secured in a locked position, a coupling link or latched hook of a safety chain for a trailer connected to the hitch mount 1 can be connected to the bail 36 of the safety chain. It is foreseen that instead of taking the form of a bail, the coupling member 36 could comprise a latched hook to which a closed loop on a safety chain could be attached or some other structure adapted to be securely engaged by a mating coupling member on the end of a safety chain or the like. In the embodiment shown, when the safety chain tie-down 21 is secured in the receiver 4 of a hitch mount 1 with the safety chain connector 23 in a latched position, a longitudinal axis through the bail 36 preferably extends parallel to the longitudinal axis of the vehicle to which it is attached and in the direction of travel of the vehicle when traveling straight. Additionally, the safety chain or the coupling link/latched hook thereof is at least partially positioned between the bail 36 and the locking member 24 and obstructs upward pivoting of the locking member 24 out of the locked position. The tie-down 21 is thus prevented from moving to the unlatched orientation.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A tie-down apparatus removably securable within a slotted receiver, the receiver defining an elongate slot and providing at least one inwardly projecting shoulder extending over an interior space of the receiver, the tie-down apparatus comprising:

a pedestal that defines a bore extending in an axial direction through the pedestal and a leg projecting from a bottom surface of the pedestal in the axial direction, the leg being insertable into the slot of the slotted receiver when a width of the leg is parallel to a width of the slot, and engagement of the leg with the slot resisting rotational movement of the pedestal relative to the slotted receiver;

a connector that includes a body, a coupling member projecting from a first side of the body, and a latching member projecting from an opposite second side of the body in the axial direction, the latching member being disposed to extend through the bore of the pedestal with an elongate head extending transverse to the axial direction, the head forming a radially extending flange, and the connector being rotatable about an axis extending in the axial direction relative to the pedestal to move the flange into axial alignment with the leg in an unlatched orientation and at least partially out of axial alignment with the leg in a latched orientation.

2. The tie-down apparatus of claim 1, further comprising:

a locking member that is pivotably coupled to the connector and includes an interference member, in the latched orientation the interference member being pivoted to extend in the axial direction alongside a surface of the pedestal, interaction between the interference member and the surface of the pedestal obstructing rotational movement of the connector relative to the pedestal, and in the unlatched orientation the interference member being pivoted away from engagement with the surface of the pedestal and enabling rotational movement of the connector relative to the pedestal.

3. The tie-down apparatus of claim 2, wherein the interference member is a first interference member and the locking member includes a second interference member that is disposed on an opposite side of the connector from the first interference member and is coupled to the first interference member by a cross-member that passes between a base of the connector and the coupling member.

4. The tie-down apparatus of claim 3, wherein first and second sides of the pedestal are planar and extend in parallel spaced relation and first and second sides of the base of the connector are planar and extend in parallel spaced relation and the width of the pedestal between the first and second sides thereof is approximately equal to the width of the base between the first and second sides thereof, and the locking member is pivotally connected to the base of the connector so that the first and second interference members extend in closely spaced relation outward from the first and second sides of the base.

5. The tie-down apparatus of claim 2, wherein in the unlatched orientation the interference member is pivoted to extend at an angle relative to a base of the connector and to a position above the pedestal in which the interference member does not obstruct rotational movement of the connector relative to the pedestal.

6. The tie-down apparatus of claim 2, wherein the pedestal includes a planar surface and the interference member lies alongside the planar surface in the latched orientation.

7. The tie-down apparatus of claim 2, wherein the locking member is pivoted by gravity to move the interference member alongside the pedestal when the connector is rotated relative to the pedestal to the latched orientation.

8. The tie-down apparatus of claim 2, wherein the locking member is pivotable between a locked position in which the interference member obstructs rotational movement of the connector to the unlatched orientation and an unlocked position in which rotational movement of the connector is unimpeded by the interference member, and wherein the locking member is dimensioned to prevent pivoting to the unlocked position when a safety chain is coupled to the coupling member, the safety chain at least partially obstructing pivotal movement of the locking member to the unlocked position.

9. The tie-down apparatus of claim 1, wherein the coupling member comprises a loop that is engageable by a safety chain of a trailer.

10. The tie-down apparatus of claim 1, further comprising:
a transverse passage in the pedestal that at least partially intersects the bore;
a groove in the latching member of the connector that is aligned transverse to the axial direction and positioned to align with the passage in the pedestal; and
a pin installed in the passage and engaging the groove, the engagement of the pin with the groove coupling the connector with the pedestal, and an arcuate length of the groove being configured to define a range of rotational motion of the connector relative to the pedestal.

11. The tie-down apparatus of claim 10, wherein the range of rotational motion is about 90 degrees.

12. A tie-down apparatus removably securable within a slot formed in a slotted receiver of a hitch mount for a truck bed, the slotted receiver including at least one inwardly projecting shoulder extending adjacent the slot and over a receiver pocket; the tie-down apparatus comprising:
a pedestal including a pedestal body having a bore extending therethrough along an axis of rotation and at least one leg depending from the pedestal body, the at least one leg formed along a portion of a circumference of the bore and having a leg-width that extends transverse to the axis of rotation and that is narrower than a width of the slot of the slotted receiver of the hitch mount, engagement of the leg with the slot resisting rotational movement of the pedestal relative to the slotted receiver;
a connector including a base, a bail extending upward from the base and a latching member extending downward from the base, the latching member having a neck and an enlarged head including at least one flange projecting radially outward from the neck and which is narrower than the width of the slot of the slotted receiver and the enlarged head having a longitudinal length that is longer than the width of the slot, the connector rotatably mounted to the pedestal with the latching member extending through the bore in the pedestal and rotatable about the axis of rotation between an unlatched orientation and a latched orientation, in the unlatched orientation a longitudinal length of the enlarged head extends transverse to the leg-width of the at least one leg such that the at least one leg and the enlarged head of the latching member are insertable widthwise into the slot of the slotted receiver, and in the latched orientation at least a portion of the at least one flange extends under the at least one inwardly projecting shoulder.

13. The tie-down apparatus of claim 12, further comprising:
a locking member pivotally connected to the base of the connector and having an interference member pivotal between a first position in which the interference member does not extend below the base of the connector and a locking position in which the interference member extends below the base of the connector and prevents rotation of the connector relative to the pedestal.

14. The tie-down apparatus of claim 12, further comprising:
a transverse passage in the pedestal body that at least partially intersects the bore;
a transverse groove in the neck of the latching member of the connector that is positioned to align with the passage in the pedestal; and
a pin installed in the passage and engaging the groove, the engagement of the pin with the groove coupling the connector with the pedestal, and an arcuate length of the groove being configured to define a range of rotational motion of the connector relative to the pedestal.

15. A tie-down apparatus removably securable within a slot formed in a slotted receiver of a hitch mount for a truck bed, the slotted receiver including first and second inwardly projecting shoulders extending over a receiver pocket on opposite sides of the slot; the tie-down apparatus comprising:
a pedestal including a pedestal body forming a bore extending therethrough along a first axis and first and second legs depending from said pedestal body on opposite sides of said bore, the first and second legs each having a leg-width that is narrower than a width of the slot of the slotted receiver of the hitch mount;

a connector including a base, a bail extending upward from the base and a latching member extending downward from the base, the latching member having a neck and a head including first and second flanges projecting radially outward from the neck in opposite directions, the head being narrower than the width of the slot of the slotted receiver and the head being longer than the width of the slot, the connector rotatably mounted to the pedestal with the latching member extending through the bore in the pedestal and rotatable about the first axis between an unlatched orientation and a latched orientation, in the unlatched orientation a longitudinal length of the head extends transversely to the leg-widths of the first and second legs such that the first and second flanges extend axially below the first and second legs such that the first and second legs and the head of the latching member are insertable widthwise into the slot of the slotted receiver and in the latched orientation at least a portion of each of the first and second flanges extends under the first and second inwardly projecting shoulders respectively of the slotted receiver, and in the latched orientation the first and second legs preventing rotational movement of the pedestal about the first axis relative to the slotted receiver.

16. The tie-down apparatus of claim 15, further comprising:

a locking member pivotally connected to the base of the connector and having first and second interference members pivotal between a raised position in which the first and second interference members do not extend below the base of the connector and a locking position in which the first and second interference members extend below the base of the connector and in closely spaced relation to the pedestal on opposite sides thereof to resist rotation of the connector about the first axis and relative to the pedestal.

17. The tie-down apparatus of claim 16, wherein the locking member pivots by gravity to the locking position when the connector is rotated to the latching position relative to the pedestal.

18. The tie-down apparatus of claim 16, wherein first and second sides of the pedestal are planar and extend in parallel spaced relation and first and second sides of the base of the connector are planar and extend in parallel spaced relation and the width of the pedestal between the first and second sides thereof is approximately equal to the width of the base between the first and second sides thereof, and the locking member is pivotally connected to the base of the connector so that the first and second interference members extend in closely spaced relation outward from the first and second sides of the base.

19. The tie-down apparatus of claim 16, wherein the first and second interference members are connected together by a cross-member extending between the base and the bail.

* * * * *